United States Patent
Kim et al.

(10) Patent No.: US 8,196,208 B2
(45) Date of Patent: Jun. 5, 2012

(54) METHOD AND APPARATUS FOR CREATING AND APPLYING SECURE FILE IDENTIFIER OF RIGHTS OBJECT BY USING RANDOM NUMBERS

(75) Inventors: Yeo-jin Kim, Suwon-si (KR); Yun-sang Oh, Seoul (KR); Sang-gyoo Sim, Suwon-si (KR); Kyung-im Jung, Seongnam-si (KR); Ji-soo Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 941 days.

(21) Appl. No.: 11/747,935

(22) Filed: May 14, 2007

(65) Prior Publication Data

US 2007/0266441 A1     Nov. 15, 2007

Related U.S. Application Data

(60) Provisional application No. 60/799,652, filed on May 12, 2006.

(30) Foreign Application Priority Data

May 4, 2007    (KR) ........................ 10-2007-0043573

(51) Int. Cl.
  *G06F 7/04*      (2006.01)
  *G06F 17/30*     (2006.01)
  *H04N 7/16*      (2011.01)

(52) U.S. Cl. .......................................................... 726/26
(58) Field of Classification Search ..................... 726/26
  See application file for complete search history.

(56) References Cited

U.S. PATENT DOCUMENTS

| 5,991,753 A | 11/1999 | Wilde |
| 6,135,646 A * | 10/2000 | Kahn et al. .................... 709/217 |
| 2005/0268090 A1 | 12/2005 | Saw et al. |

FOREIGN PATENT DOCUMENTS

KR    10-2006-0029879 A     4/2006

\* cited by examiner

*Primary Examiner* — Kambiz Zand
*Assistant Examiner* — Stephen Sanders
(74) *Attorney, Agent, or Firm* — Sughrue Mion, PLLC

(57) ABSTRACT

Provided are a method and apparatus for creating and applying a secure file identifier of a rights object by using random numbers. The apparatus includes a secure-file-identifier generating unit which creates the secure file identifier by generating a random number and combining the random number with a hash value corresponding to a rights object identifier of the file identifier list; a transmitting unit which transmits the secure file identifier to the storage device; and a receiving unit which receives a secure file identifier list for identifying the rights object from a storage device.

21 Claims, 7 Drawing Sheets

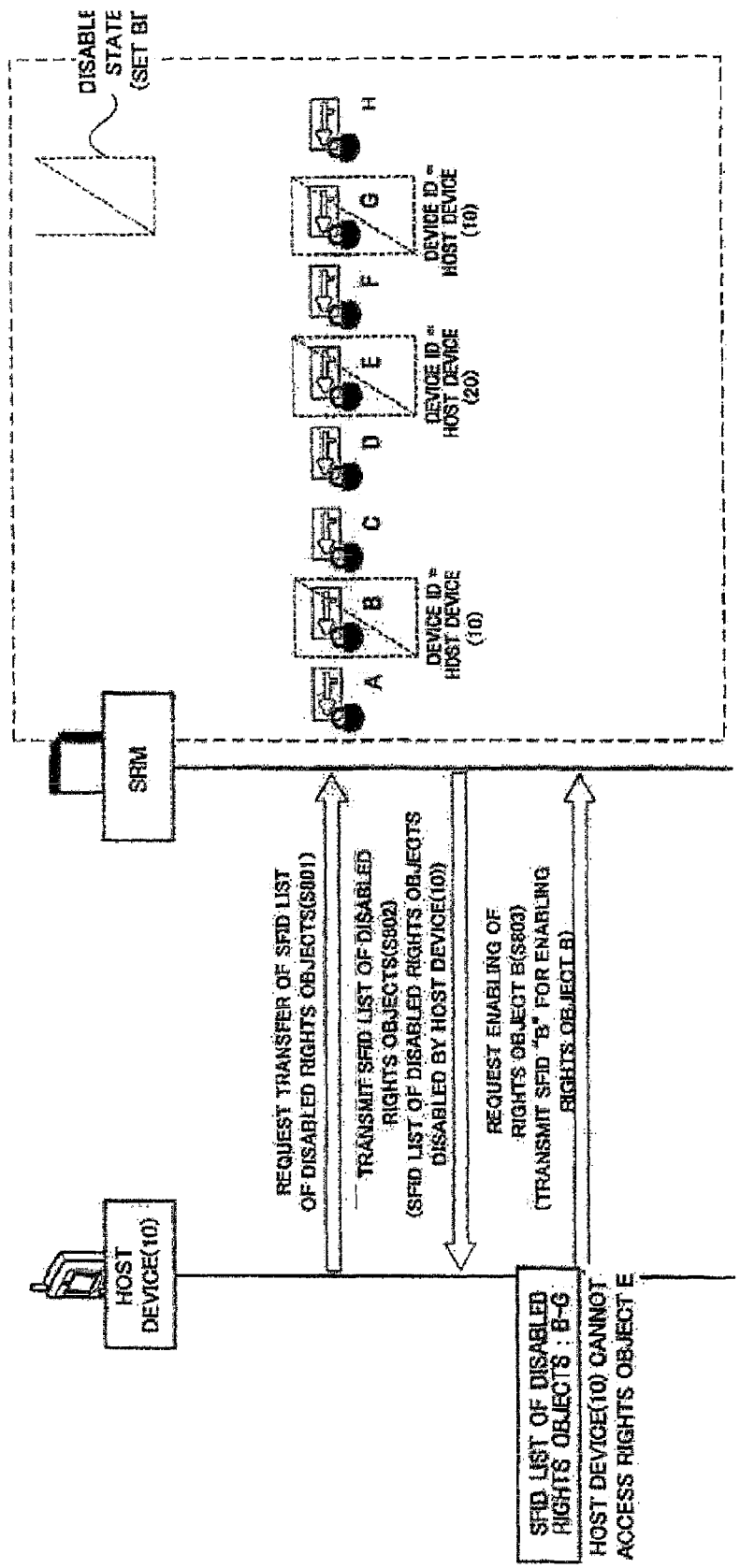

METHOD AND APPARATUS FOR CREATING AND APPLYING SECURE FILE IDENTIFIER OF RIGHTS OBJECT BY USING RANDOM NUMBERS

CROSS-REFERENCE TO RELATED APPLICATIONS

This application claims priority from Korean Patent Application No. 10-2007-0043573 filed on May 4, 2007 in the Korean Intellectual Property Office and U.S. Provisional Patent Application No. 60/799,652 filed on May 12, 2006 in the United States Patent and Trademark Office, the disclosures of which are incorporated herein in their entirety by reference.

BACKGROUND OF THE INVENTION

1. Field of the Invention

Apparatuses and methods consistent with the present invention relate to creating and applying a secure file identifier (SFID) of a rights object by using random numbers, and more particularly, to efficiently managing and protecting the rights object by disabling the rights object using the SFID when the rights object is transferred and used between a host device and secure removable media (SRM).

2. Description of the Related Art

Recently, when a rights object is transferred and used between a host device and an SRM, a rights object identifier (ROID), as a specific file identifier (FID) for the rights object, is generally hashed into a specific length when the rights object is issued by a rights issuer.

With respect to digital rights management (DRM), the ROID is generally known to be unique. However, there is no known related art method which can fully guarantee the uniqueness of ROIDs.

Generally, in terms of managing efficiency, when creating an FID in a predetermined length to correspond to a rights object stored in an SRM, a hash value of 20 bytes from the ROID is used. However, since the length of the ROIDs may vary according to the rights issuer, the uniqueness of FIDs may be lowered to cause collisions with each other.

Further, although there is a related art method of creating an FID by a separate rule to avoid collision with the existing FIDs and by considering the file management system of SRM, it is difficult to ascertain the relationship to the ROID of a rights object. Thus, there is a need for means to form a relationship between the ROID and the FID.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and a method which increase the uniqueness of an FID of a rights object and efficiently disable the rights object by creating an SFID of the rights object by using random numbers.

According to an aspect of the present invention, there is provided an apparatus for creating and applying a secure file identifier of a rights object by using random numbers, the apparatus including: a secure-file-identifier generating unit which creates the secure file identifier by generating a random number and combining the random number with a hash value corresponding to a rights object identifier of the file identifier list; and a transmitting unit which transmits the secure file identifier to a storage device; and a receiving unit which receives a secure file identifier list for identifying rights objects from the storage device.

According to another aspect of the present invention, there is provided an apparatus for creating and applying a secure file identifier of a rights object by using random numbers, the apparatus including: a secure-file-identifier-list generating unit which creates a secure file identifier list to show the list of containing the stored rights objects; a receiving unit which receives a pair of SFIDs from a host device to replace a first SFID with a second SFID, and a rights-object managing unit which replaces the first secure file identifier with the second secure file identifier, and changes a status of the rights object corresponding to the second secure file identifier.

According to another aspect of the present invention, there is provided a method of creating and applying a secure file identifier of a rights object by using random numbers, the method including: receiving a file identifier list for identifying the rights object from a storage device; creating the secure file identifier by generating a random number and combining the random number with a hash value corresponding to a rights object identifier of the file identifier list; and transmitting the secure file identifier to the storage device.

According to another aspect of the invention, there is provided a method of creating and applying a secure file identifier of a rights object by using random numbers, the method including: generating a secure file identifier list to show the list of containing the stored rights objects; receiving a pair of SFIDs from a host device to replace a first SFID with a second SFID, and managing rights objects by replacing the first secure file identifier with the second secure file identifier, and changing a status of the rights object corresponding to the second secure file identifier.

BRIEF DESCRIPTION OF THE DRAWINGS

The above and other aspects of the present invention will become more apparent by describing in detail exemplary embodiments thereof with reference to the attached drawings, in which:

FIG. 8 is a diagram illustrating a process of searching and enabling a disabled rights object by using an identifier (ID) of a host device, according to an exemplary embodiment of the present invention.

DETAILED DESCRIPTION OF EXEMPLARY EMBODIMENTS OF THE INVENTION

Figure 1:
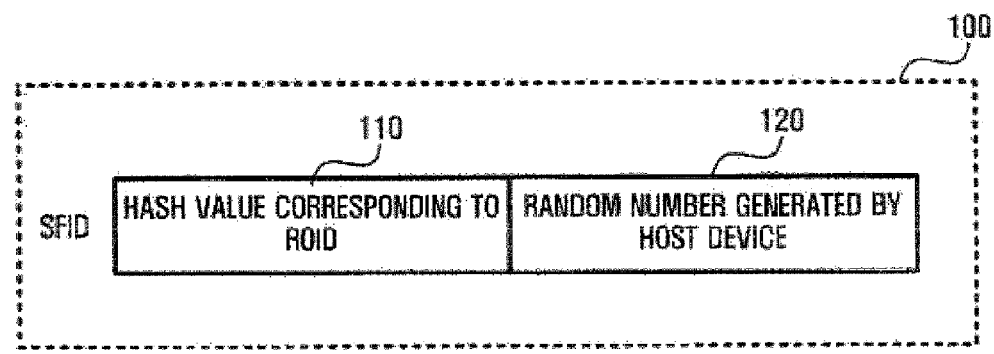
FIG. 1 is a diagram illustrating a configuration of an SFID according to an exemplary embodiment of the present invention.

The various aspects and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention is defined by the appended claims. Like reference numerals refer to like elements throughout the specification.

The exemplary embodiments of the present invention are described hereinafter with reference to block diagrams or flowcharts for illustrating methods and apparatuses for creating and applying an SFID of a rights object by using random numbers.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer readable recording medium that can direct a computer or other programmable data processing apparatus to function in a particular manner, such that the instructions stored in the computer usable or computer readable recording medium produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIG. 1 is a diagram illustrating a configuration of an SFID according to an exemplary embodiment of the present invention.

An SFID 100 according to the exemplary embodiment is used as an FID for identifying a rights object in an SRM. The SFID 100 has a specific length and is obtained by combining a hash value 110 of an ROID with random number 120 generated by a host device which installs a corresponding rights object.

The SFID 100 according to the exemplary embodiment can only be recognized by the host device, which created the SFID, in specific cases and has many advantages with respect to security, which will be described later.

Figure 2:
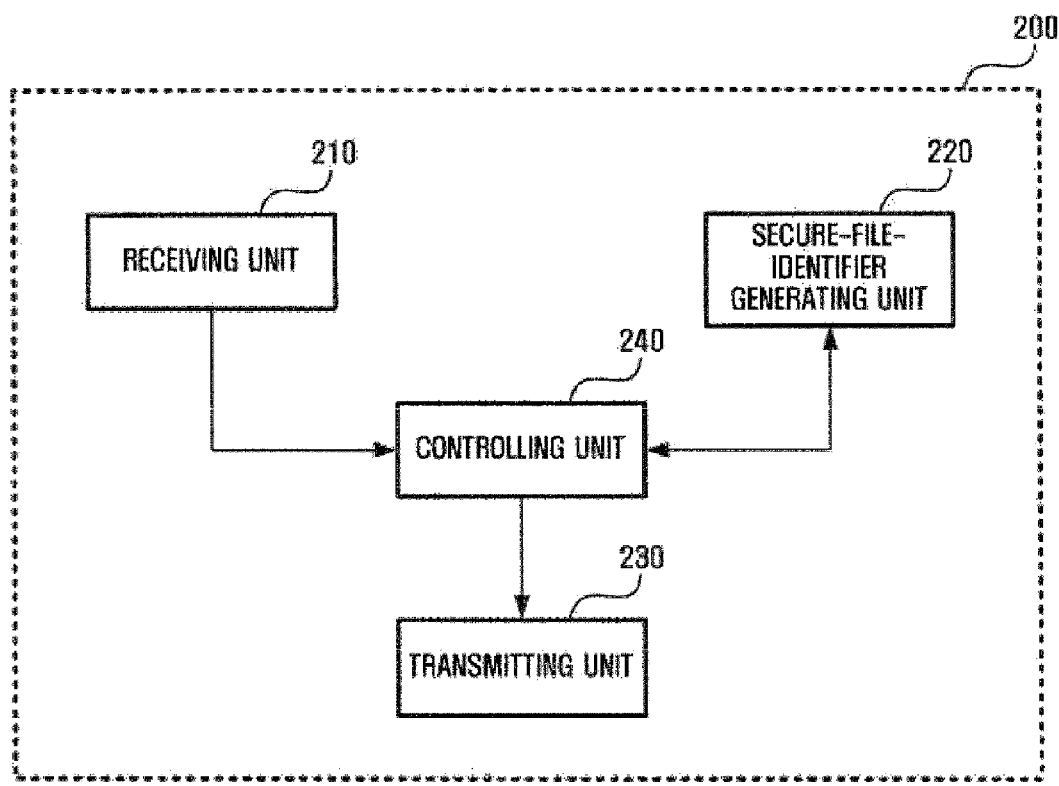
FIG. 2 is a block diagram illustrating an apparatus for creating and applying an SFID of a rights object by using random numbers, according to an exemplary embodiment of the present invention.

FIG. 2 is a block diagram illustrating an apparatus for creating and applying an SFID of a rights object by using random numbers, according to an exemplary embodiment of the present invention.

An apparatus 200 for creating and applying an SFID of a rights object by using random numbers, includes a secure-file-identifier generating unit 220 which creates an SFID having a specific length by generating and combining a specific random number with a hash value corresponding to an ROID of the FID list, a transmitting unit 230 which transmits the created SFID to the storage device, a controlling unit 240 which controls each unit and sends a task request to a storage device to transfer, install, delete or copy the rights object, and a receiving unit 210 which receives an SFID list for identifying the rights object from the storage device (not shown).

The storage device may be at least one from an SRM and a device having a predetermined storage space with security function such as a personal computer (PC), a personal digital assistant (PDA), an MP3 player and a portable media player (PMP). Here, an SRM as the storage device will be used to explain the exemplary embodiments.

Figure 3:
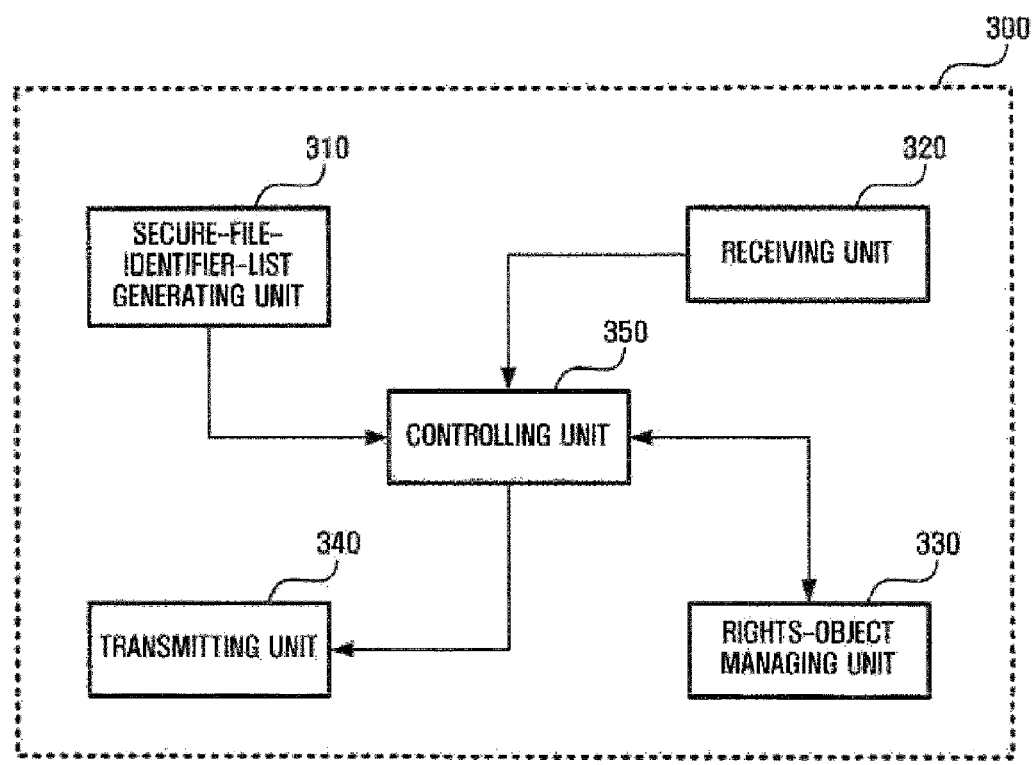
FIG. 3 is a block diagram illustrating an apparatus for creating and applying an SFID of a rights object by using random numbers, according to another exemplary embodiment of the present invention.

FIG. 3 is a block diagram illustrating an apparatus for creating and applying an SFID of a rights object by using random numbers, according to another exemplary embodiment of the present invention.

An apparatus 300 for creating and applying an SFID of a rights object by using random numbers, includes a secure-file-identifier-list generating unit 310 which creates an SFID list to show the list of stored rights objects, a receiving unit 320 which receives a pair of SFIDs from a host device to replace a first SFID with a second SFID, and a rights-object managing unit 330 which replaces the first SFID with the second SFID and changes the status of the rights object corresponding to the second SFID, a transmitting unit 340 which transmits the SFID list generated from the secure-file-identifier-list generating unit 310 to the host device, and a controlling unit 350 which controls each unit.

Examples of the apparatus 300 shown in FIG. 3 may include an SRM and a device having a predetermined storage space with security function such as a PC, a PDA, an MP3 player and a PMP. As described above, an SRM as the storage device will be used to explain the exemplary embodiments.

Each component shown in FIGS. 2 and 3 refers to a software element or a hardware element, such as a Field Programmable Gate-Array (FPGA) or an Application-Specific Integrated Circuit (ASIC), which performs a predetermined function. However, the component does not always have a meaning limited to software or hardware. The component may be constructed either to be stored in an addressable storage medium or to execute one or more processors. Therefore, the component includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the component may be either combined into a smaller number of elements or components or divided into a larger number of elements or components.

The receiving unit 210 in the apparatus 200 shown in FIG. 2 receives an SFID list for identifying the list of rights objects from the SRM.

Here, the SFID list includes SFIDs corresponding to enabled rights objects stored in the SRM.

Additionally, the state of the rights object means that the rights object is either in an enabled state or a disabled state. The state of the rights object will be mentioned in detail referring to FIG. 3.

The secure-file-identifier generating unit 220 creates an SFID having a specific length by generating and combining a specific random number with a hash value corresponding to an ROID of the FID list received by the receiving unit 210.

For example, if the hash value corresponding to the ROID of the FID list received by the receiving unit 210 is 20 bytes and the generated random number is 8 bytes, the SFID created by the secure-file-identifier generating unit 220 has increased uniqueness by having 28 bytes, which makes it possible to search the rights objects at a faster rate by serving as the hash value of the ROID.

Additionally, security can be increased since only the host device which created the SFID can recognize and analyze the SFID in specific cases.

The controlling unit 240 sends a task request from a host device to an SRM to transfer, install, delete or copy a rights object.

Here, "transfer" means transferring a rights object from a source device to a target device. During the process of transferring the rights object, the same rights object may exist in the two devices. However, after the completion of transferring the rights object to the target device, the rights object can only exist in the target device.

"Install" means a process of storing a rights object in a device such as a host device and an SRM, making it possible to use the rights object by being connected to content, and "delete" means deleting the rights object from the source device after the completion of transferring the rights object to the target device.

Additionally, "copy" means that the same rights object can be used by two or more devices by being stored therein.

The secure-file-identifier-list generating unit 310 of the apparatus 300 shown in FIG. 3 generates an SFID list to show the list of stored rights objects.

Here, the secure-file-identifier-list generating unit 310 generates the SFID list corresponding only to rights objects in an enabled state or only to rights objects in a disabled state.

"Enabled state" means that a rights object is in a state which it can be used, and the enabled state of the rights object can be changed to the disabled state by a process and a device having predetermined conditions.

"Disabled state" means that a rights object is in a state which it cannot be used, and unless the state is changed to the enabled state, the disabled state cannot be changed by the end of a process or power interruption. The disabled state of the rights object can be changed to the enabled state by a process and a device having predetermined conditions.

At this time, whether a rights objects stored in an SRM is in an enabled state or in a disabled state can be distinguished by assigning a bit "0" or "1" to each state, and various methods can be used to indicate the enabled or disabled states of the rights objects.

The rights-object managing unit 330, when a rights object is transferred from the host device to the SRM, allocates a rights slot for the rights object and stores an SFID in a corresponding space.

Also, the rights-object managing unit 330, when a rights object is transferred from the host device to the SRM, changes the state of the rights object to a disabled state, and replaces a first SFID corresponding to the previous rights object with a second SFID received from the receiving unit 320. Here, the second SFID is generated by the host device to disable the rights object transferred to the SRM.

Figure 4:
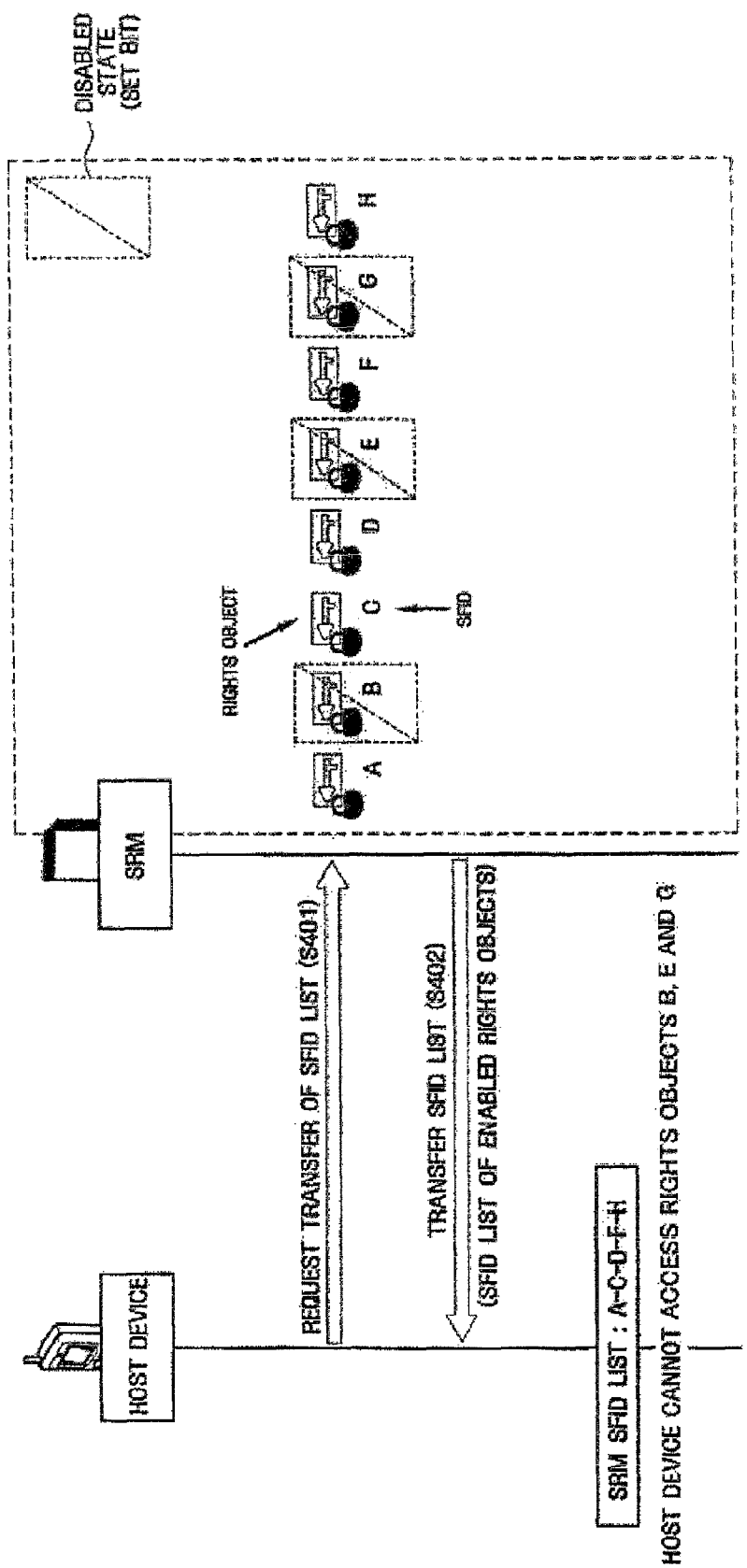
FIG. 4 is a diagram illustrating a process of retrieving an SFID list from an SRM by a host device, according to an exemplary embodiment of the present invention.

FIG. 4 is a diagram illustrating a process of retrieving an SFID list from an SRM by a host device, according to an exemplary embodiment of the present invention.

Here, the SRM stores rights objects A, B, C, D, E, F, G and H. The rights objects A, C, D, F and H are in an enabled state, and the rights objects B, E and G are in a disabled state, which are already disabled by a specific host device.

First, the host device requests transfer of an SFID list from the SRM (operation S401).

Then, the SRM generates an SFID list corresponding to rights objects in the enabled state and transmits the SFID list to the host device (operation S402).

At this time, the rights objects A, C, D, F and H are stored in the SRM in the enabled state, and the rights objects B, E and G are stored in the disabled state which are already disabled by a specific host device.

Here, the specific host device may be a host device shown in FIG. 4 or another host device not shown in FIG. 4.

When the enabled state of a rights object has been changed to the disabled state, even the host device which has performed this task cannot always enable the disabled rights object. The disabled rights object can only be enabled by a host device capable of recognizing the SFID corresponding to the disabled rights object by implementing a separate process.

Thus, the SFID list transmitted by the SRM only has the SFIDs corresponding to the rights objects A, C, D, F and H, and the host device can only access these rights objects.

Figure 5:
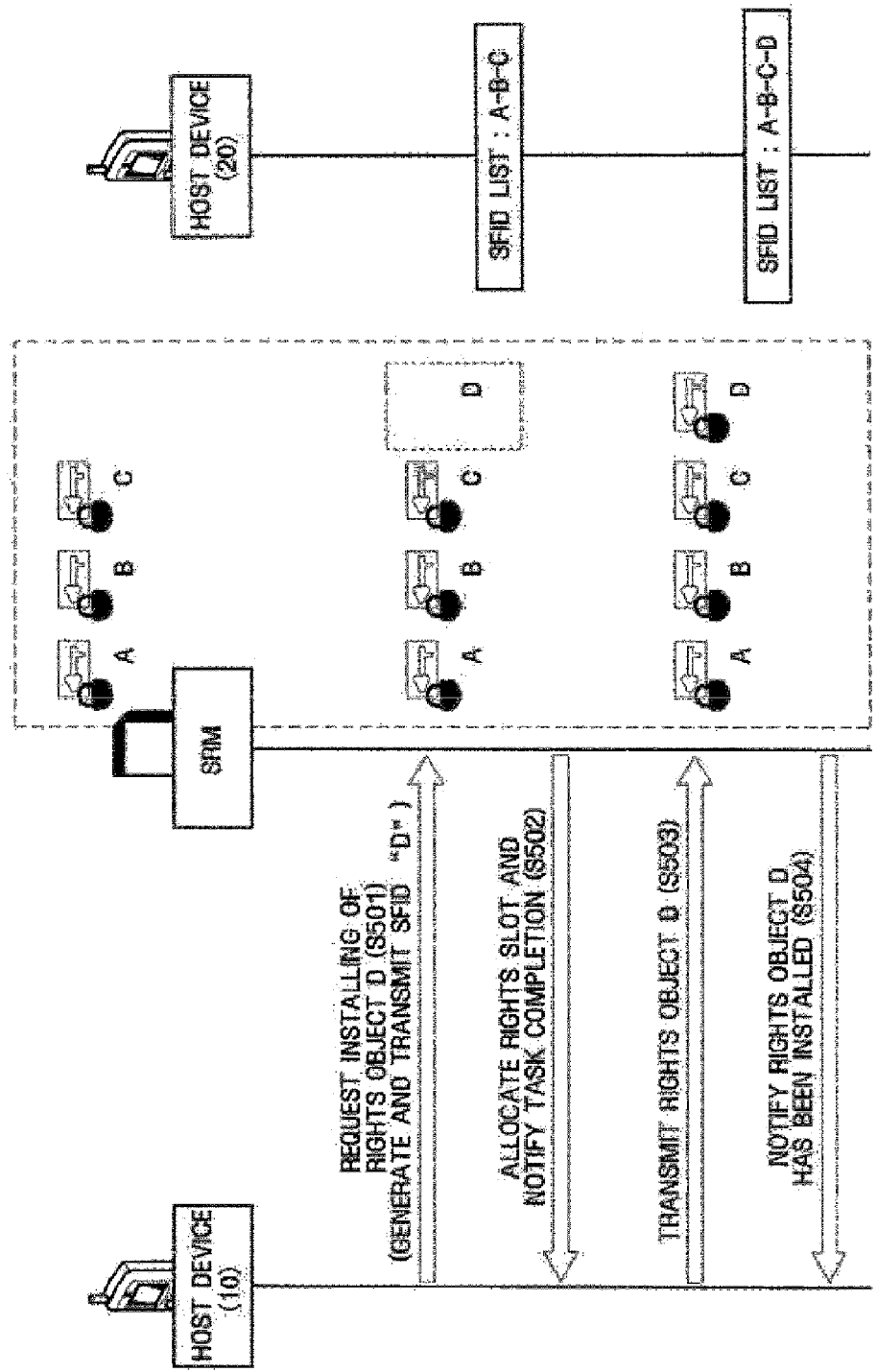
FIG. 5 is a diagram illustrating an application of an SFID when a rights object is transferred from a host device to an SRM, according to an exemplary embodiment of the present invention.

FIG. 5 is a diagram illustrating an application of an SFID when a rights object is transferred from a host device to an SRM, according to an exemplary embodiment of the present invention.

Here, rights objects A, B and C exist in the SRM, and a host device 10 installs a rights object D in the SRM.

First, the host device 10 requests installation of the rights object D to the SRM (operation S501).

At this time, the host device 10 creates an SFID "D" having a specific length by generating a specific random number for installing the rights object D in the SRM and by combining the random number with a hash value corresponding to an ROID of the rights object D, and transmits the SFID "D" to the SRM.

Next, the SRM allocates a rights slot to store the rights object D and stores the SFID "D" in a corresponding space, and then notifies the host device once the task is completed (operation S502).

At this time, when a host device 20 other than the host device 10 requests an SFID list, the host device 20 can recognize the rights objects A, B and C.

Then, the host device 10 transmits the rights object D to the SRM (operation S503).

Thereafter, the SRM store the rights object D in the rights slot allocated by using the SFID "D", and notifies the host device 10 once the rights object D has been installed (operation S504).

At this time, when the host device 20 requests an SFID list, the host device 20 can recognize the rights objects A, B, C and D.

Figure 6:
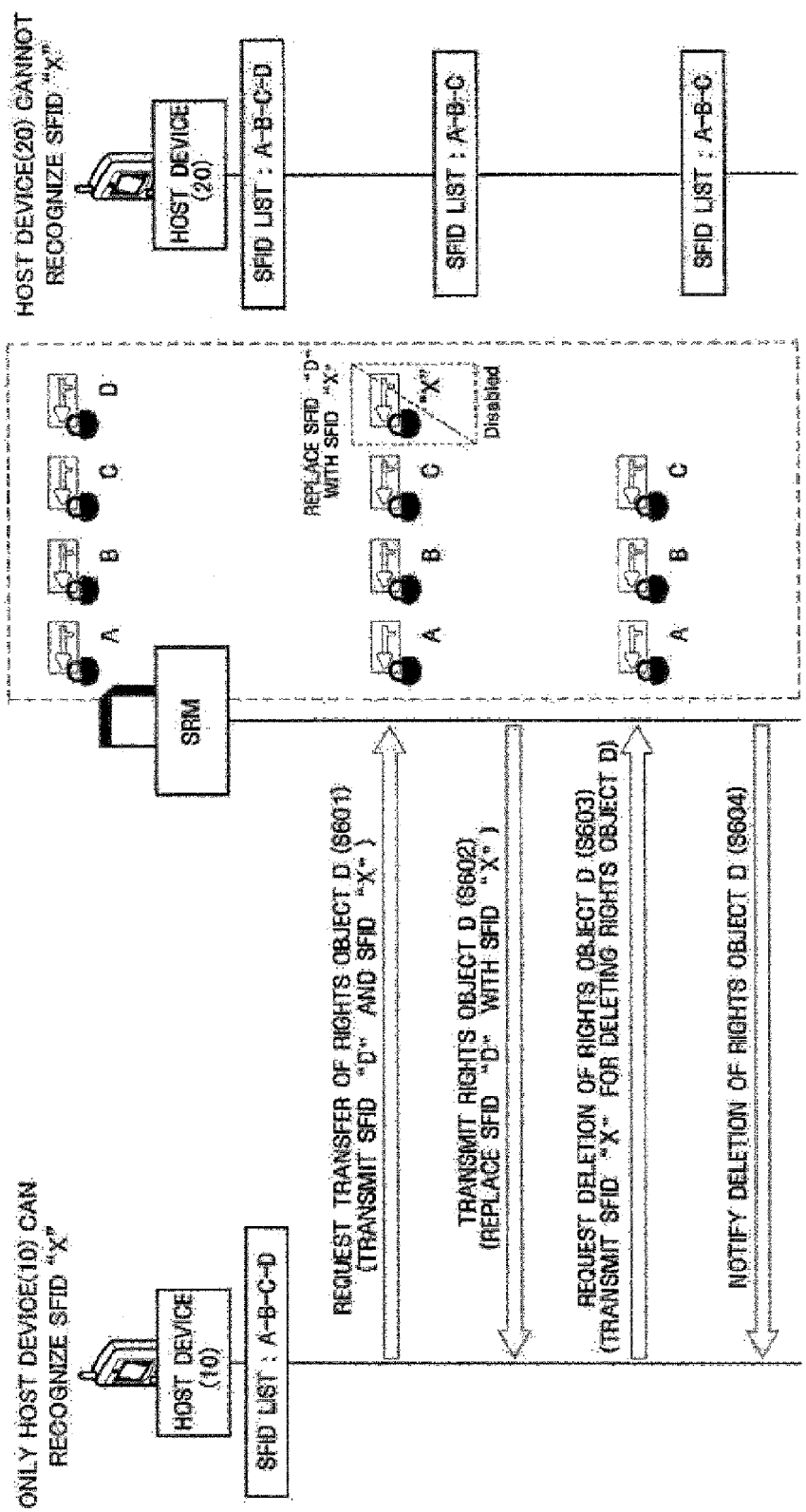
FIG. 6 is a diagram illustrating an application of an SFID when a rights object is transferred from an SRM to a host device, according to an exemplary embodiment of the present invention.

FIG. 6 is a diagram illustrating an application of an SFID when a rights object is transferred from an SRM to a host device, according to an exemplary embodiment of the present invention.

Here, rights objects A, B, C and D exist in the SRM, and a host device 10 receives a rights object D from the SRM. An SFID list from the SRM has already been received by the host device 10 through the process illustrated in FIG. 4.

First, the host device 10 requests transfer of the rights object D from the SRM (operation S601).

At this time, the host device 10 creates an SFID "X" having a specific length by generating and combining a specific random number with a hash value corresponding to an ROID of the rights object D, and transmits an SFID "D" corresponding to the rights object D obtained via the SFID list and the SFID "X" to the SRM to disable the rights object D.

Here, up to this point, when another host device such as a host device 20 accesses the SRM and requests an SFID list, the host device 20 receives an SFID list having the rights objects A, B, C and D.

Then, the SRM receives the SFID "D" and the SFID "X" from the host device 10, searches the rights object D corresponding to the SFID "D" to set the state of the rights object D to a disabled state, replaces the existing SFID "D" of the rights object D with the SFID "X," and transmits the rights object D to the host device 10 (operation S602).

Here, after this point, when the host device 20 accesses the SRM, the host device 20 cannot recognize the rights object D now corresponding to the SFID "X," since the rights object D is in the disabled state.

Additionally, even if the transfer process ends abnormally at this point, since the state of a rights object is a disabled state, the same rights object can be prevented from being copied and used in more than two devices.

Here, the rights object D in the disabled state can only be accessed by a host device which is able to recognize the SFID "X" or by the host device which has disabled the rights object D by a separate process to be described later referring to FIG. 8.

In the event the host device 10 being able to recognize the SFID "X" reconnects after abnormally ending the process, the process resumes after operation S602.

Next, the host device 10 receives the rights object D from the SRM and requests the SRM to delete the rights object D. At this time, the host device 10 transmits the SFID "X" corresponding to the rights object D to the SRM (operation S603).

Thereafter, the SRM allows only a host device that has generated the SFID "X," i.e. the host device 10, to access the disabled rights object D, deletes the rights object D according to the request, and notifies the result of the deletion process to the host device 10 (operation S604).

Then, the host device 10 ends the transfer process after confirming the rights object D has been deleted.

Figure 7:
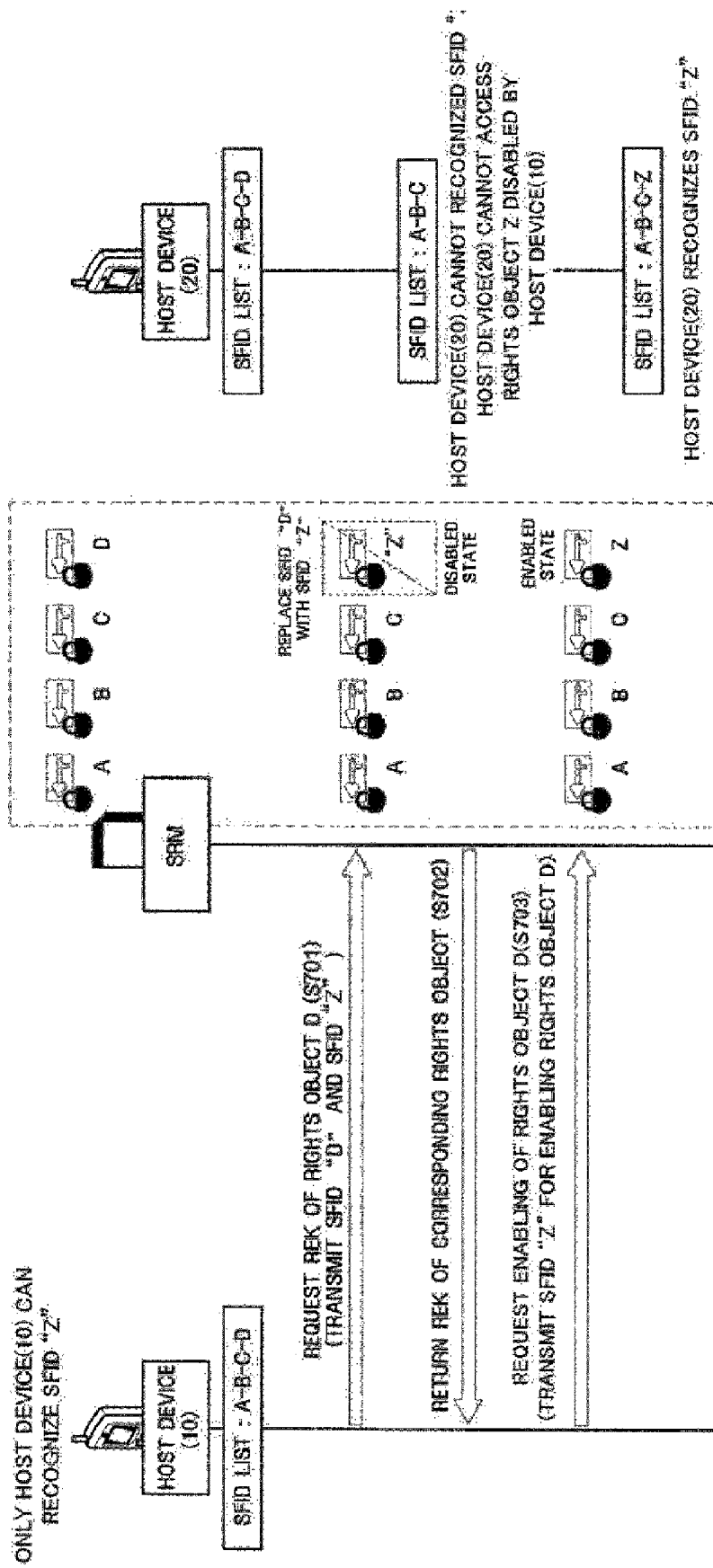
FIG. 7 is a diagram illustrating an application of an SFID to use a rights object stored in an SRM, according to an exemplary embodiment of the present invention.

FIG. 7 is a diagram illustrating an application of an SFID to use a rights object stored in an SRM, according to an exemplary embodiment of the present invention.

Here, rights objects A, B, C and D exist in the SRM, and a host device 10 uses a rights object D from the SRM. An SFID list from the SRM has already been received by the host device 10 through the process illustrated in FIG. 4.

First, the host device 10 requests a rights encryption key (REK) for the rights object D to regenerate content corresponding to the rights object D, from the SRM (operation S701).

At this time, the host device 10 creates an SFID "Z" having a specific length by generating and combining a specific random number with a hash value corresponding to an ROID of the rights object D, and transmits the SFID "D" corresponding to the rights object D obtained via the SFID list and the SFID "Z" to the SRM to disable the rights object D.

Next, the SRM receives the SFID "D" and the SFID "Z" from the host device 10, searches the rights object D corresponding to the SFID "D," and replaces the existing SFID "D" of the rights object D with the SFID Then, the SRM disables the rights object D now corresponding to the SFID "Z," and transmits the REK to the host device 10 (operation S702).

Here, another host device such as a host device 20 cannot recognize the rights object D disabled by using the SFID "Z," and, at this stage, other host devices cannot access the SRM even though the host devices may have previously received the SFID list, since the host devices cannot recognize the SFID, i.e. the SFID "Z," of the disabled rights object D.

Next, after receiving the REK, the host device 10 uses the rights object D and requests the rights object D to be released (operation S703). At this time, the host device 10 transmits the SFID "Z" to the SRM to enable the rights object D.

Thereafter, the SRM receives the request and enables the rights object D.

At this time, the host device 20 can recognize the rights object D having a new SFID, i.e. the SFID "Z."

Here, when changing the state of a rights object to an enabled state to use the rights object, the process can proceed after verifying whether a host device which performs this process is the same host device which has previously changed the state of the rights object to a disabled state. However, such a verification process is not necessary for the ordinary use of the rights objects. Rather, the verification process may be used in the case when there is a concern that the rights object might be leaked without authorization or unintentionally, such as in the case when a connection to a host device has been re-established after interruption.

FIG. 8 is a diagram illustrating a process of searching and enabling a disabled rights object by using an ID of a host device, according to an exemplary embodiment of the present invention.

Here, the SRM stores rights objects A, B, C, D, E, F, G and H. The rights objects A, C, D, F and H are in an enabled state, and the rights objects B, E and G are in a disabled state.

Also, the rights object B and G both in the disabled state have been disabled by a host device 10, and the rights object E in the disabled state has been disabled by a host device 20.

First, the host device 10 requests transfer of an SFID list corresponding to disabled rights objects from the SRM (operation S801).

Next, the SRM generates the SFID list by searching among disabled rights objects the ones having indicated with the ID of the host device 10 which has changed their states to the disable state, and transmits the SFID list to the host device 10 (operation S802).

At this time, the host device 20 cannot recognize the rights objects B and G disabled by the host device 10.

Then, the host device 10 receives the SFID list corresponding to the rights objects which it has disabled, and selects more than one SFIDs to enable the rights objects corresponding to the selected SFIDs.

Next, the host device 10 transmits an SFID "B" to the SRM and requests to enable the rights object B (operation S803).

Then, after receiving the SFID "B," the SRM changes the state of the rights object B corresponding to the SFID "B" to an enabled state, and deletes the host device ID from the rights object B.

Thereafter, the host device 20 can recognize the enabled rights object B.

Here, although an SFID can be used to efficiently carry out the process of enabling and disabling a rights object, the following two circumstances may arise.

First, the case when the host device 10 has lost an SFID "X"

Once the host device 10 has lost the SFID "X" after disabling a rights object, there is no method of enabling the rights object.

In anticipation of the above case, according to an exemplary embodiment of the present invention, a rights object to be stored in an SRM can be stored in the following configuration.

| SFID | Bit Flag (Enabled/Disabled) | Device ID | Rights Object Information |
|------|------------------------------|-----------|---------------------------|

Here, in addition to a bit flag for indicating enabled or disabled states, a utility bit flag can also be used. The device ID means the ID of a host device which has changed the state of a rights object to a disabled state.

In the event the host device 10 has lost the SFID of the disabled rights object, the host device 10 can receive an SFID list having the same device ID by comparing the device ID of the host device 10 and the device ID of the disabled SFID list.

The host device 10 can implement appropriate steps such as enabling or deleting a rights object stored in the SRM by combining the disabled rights objects stored in the SRM with corresponding disabled rights object information in the host device 10.

Second, the case when the host device 10 has leaked an SFID "X"

When the host device 10 has been cracked by having its security comprised, the SFID of a disabled rights object may be open to the public, and access by other host devices may be allowed.

To prevent the access by other host devices, a device ID of a host device can be checked when the state of a disabled rights object stored in the SRM is being changed to an enabled state.

For example, when the host device 20 attempts to access a rights object disabled by the host device 10, by using the SFID leaked by the host device 10, the access by the host device 20 will be denied because of its different device ID from that of the host device 10.

Here, the device ID does not necessary have to be transmitted during this protocol, but it may be transmitted and received during the initial validation between a host device and an SRM.

The apparatus for creating and applying an SFID of a rights object by using random numbers, according to the exemplary embodiments of the present invention as described above, may provide the following advantages.

The uniqueness of an FID of a rights object can be increased.

Additionally, a rights object disabled by a specific host device can only be accessed by a host device which is able to distinguish the SFID of the rights object, and since the disabled rights object cannot be recognized by other host devices, the process of enabling and disabling the rights object stored in an SRM can be performed safely.

Further, since the cost of enabling and disabling the rights object stored in an SRM is low, it is possible to implement enabling and disabling of a rights object in a process of transferring the rights object in addition to a process requiring real-time processing such as a process of using/consuming the rights object, which improves the security of the use of the rights object, compared to the existing "lock/unlock" function.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in descriptive sense only and not for purposes of limitation.

What is claimed is:

1. An apparatus for creating and applying a secure file identifier of a rights object by using random numbers, the apparatus comprising:
    a receiving unit which receives a secure file identifier list for identifying rights objects from a storage device;
    a secure-file-identifier generating unit which creates the secure file identifier by generating a random number and combining the random number with a hash value corresponding to a rights object identifier of the rights object identified in the secure file identifier list; and
    a transmitting unit which transmits the secure file identifier to the storage device,
    wherein when the apparatus requests to the storage device to transfer, delete, copy, or use the rights object, the secure-file-identifier generating unit creates another secure file identifier by generating another random number and combining the another random number with the hash value corresponding to the rights object identifier of the rights object, and transmitting unit transmits the another secure file identifier to the storage device.

2. The apparatus of claim 1, wherein the secure file identifier has a specific length.

3. An apparatus for creating and applying a secure file identifier of a rights object by using random numbers, the apparatus comprising:
    a secure-file-identifier-list generating unit which creates a secure file identifier list for identifying rights objects including the rights object, wherein the created secure file identifier list associates a first secure file identifier with the rights object;
    a receiving unit which receives at least one secure file identifier from a host device to replace the first secure file identifier with a second secure file identifier; and
    a rights-object managing unit which replaces the first secure file identifier with the second secure file identifier, and changes a status of the rights object in the secure file identifier list to associate the second secure file identifier with the rights object,
    wherein the secure file identifier has a specific length and is obtained by combining a specific random number generated by the host device with a hash value corresponding to a rights object identifier of the rights object.

4. The apparatus of claim 3, wherein the rights object is in one of an enabled state and a disabled state.

5. The apparatus of claim 4, wherein the secure-file-identifier-list generating unit generates the secure file identifier list corresponding to rights objects in the enabled state.

6. The apparatus of claim 4, wherein the secure-file-identifier-list generating unit generates the secure file identifier list corresponding to rights objects in the disabled state.

7. The apparatus of claim 6, wherein the rights-object managing unit changes the status of the rights object by referring to an identifier of the host device from the secure file identifier list, if the rights object is in the disabled state.

8. The apparatus of claim 3, further comprising a transmitting unit which transmits the secure file identifier list generated by the secure-file-identifier-list generating unit to the host device.

9. A method of creating and applying a secure file identifier of a rights object by using random numbers, the method comprising:
receiving a secure file identifier list for identifying rights objects from a storage device;
creating the secure file identifier by generating a random number and combining the random number with a hash value corresponding to a rights object identifier of the rights object identified in the secure file identifier list;
transmitting the secure file identifier to the storage device,
creating another secure file identifier by generating another random number and combining the another random number with the hash value corresponding to the rights object identifier of the rights object when the apparatus requests to the storage device to transfer, delete, copy, or use the rights object; and
transmitting the another secure file identifier to the storage device.

10. The method of claim 9, wherein the secure file identifier has a specific length.

11. A method of creating and applying a secure file identifier of a rights object by using random numbers, the method comprising:
generating, using a processor, a secure file identifier list for identifying stored rights objects including the rights object, wherein the generated secure file identifier list associates a first secure file identifier with the rights object;
receiving a second secure file identifier from a host device to replace the first secure file identifier corresponding to the rights object with the second secure file identifier; and
managing rights objects by replacing the first secure file identifier with the second secure file identifier, and changing a status of the rights object in the secure file identifier list to associate the second secure file identifier with the rights object,
wherein the second secure file identifier has a specific length and is obtained by combining a specific random number generated by the host device with a hash value corresponding to a rights object identifier of the rights object.

12. The method of claim 11, wherein the rights object is in one of an enabled state and a disabled state.

13. The method of claim 12, wherein the generating the secure file identifier list is performed by generating the secure file identifier list corresponding to rights objects in the enabled state.

14. The method of claim 12, wherein the generating the secure file identifier list is performed by generating the secure file identifier list corresponding to rights objects in the disabled state.

15. The method of claim 14, wherein managing the rights objects is performed by changing the status of the rights object by referring to an identifier of the host device from the secure file identifier list, if the rights object is in the disabled state.

16. The method of claim 11, further comprising transmitting the secure file identifier list to the host device.

17. A non-transitory computer readable recording medium storing a computer program which when executed by a computer, performs a method of creating and applying a secure file identifier of a rights object by using random numbers, the method comprising:
receiving a secure file identifier list for identifying rights objects from a storage device;
creating the secure file identifier by generating a random number and combining the random number with a hash value corresponding to a rights object identifier of the rights object identified in the secure file identifier list;
transmitting the secure file identifier to the storage device,
creating another secure file identifier by generating another random number and combining the another random number with the hash value corresponding to the rights object identifier of the rights object when the apparatus requests to the storage device to transfer, delete, copy, or use the rights object; and
transmitting the another secure file identifier to the storage device.

18. A non-transitory computer readable recording medium storing a computer program which when executed by a computer, performs a method of creating and applying at least one secure file identifier of a rights object by using random numbers, the method comprising:
generating a secure file identifier list for identifying stored rights objects including the rights object, wherein the generated secure file identifier list associates a first secure file identifier with the rights object;
receiving the at least one secure file identifier from a host device to replace the first secure file identifier with a second secure file identifier; and
managing rights objects by replacing the first secure file identifier with the second secure file identifier, and changing a status of the rights object in the secure file identifier list to associate the second secure file identifier with the rights object,
wherein the second secure file identifier has a specific length and is obtained by combining a specific random number generated by the host device with a hash value corresponding to a rights object identifier of the rights object.

19. The apparatus of claim 7, wherein the rights-object managing unit changes the status of the rights object by referring to the identifier of the host device from the secure file identifier list in response to the host device losing the first secure file identifier or leaking the first secure file identifier.

20. The method of claim 15, wherein the managing the rights object is performed by changing the status of the rights object by referring to the identifier of the host device from the secure file identifier list in response to the host device losing the first secure file identifier or leaking the first secure file identifier.

21. The computer readable recording medium of claim 18, wherein the managing the rights object is performed by changing the status of the rights object by referring to an identifier of the host device from the secure file identifier list in response to the host device losing the first secure file identifier or leaking the first secure file identifier.

* * * * *